United States Patent
Iturbe et al.

(10) Patent No.: US 10,657,010 B2
(45) Date of Patent: May 19, 2020

(54) ERROR DETECTION TRIGGERING A RECOVERY PROCESS THAT DETERMINES WHETHER THE ERROR IS RESOLVABLE

(71) Applicant: ARM Limited, Cambridge (GB)

(72) Inventors: Xabier Iturbe, Cambridge (GB); Emre Ozer, Buckden (GB); Balaji Venu, Cambridge (GB)

(73) Assignee: ARM Limited, Cambridge (GB)

( * ) Notice: Subject to any disclaimer, the term of this patent is extended or adjusted under 35 U.S.C. 154(b) by 149 days.

(21) Appl. No.: 15/800,145

(22) Filed: Nov. 1, 2017

(65) Prior Publication Data
US 2018/0129573 A1    May 10, 2018

(30) Foreign Application Priority Data

Nov. 4, 2016  (GB) .................................. 1618654.6

(51) Int. Cl.
*G06F 11/00*  (2006.01)
*G06F 11/16*  (2006.01)
(Continued)

(52) U.S. Cl.
CPC ...... *G06F 11/1608* (2013.01); *G06F 11/0793* (2013.01); *G06F 11/1008* (2013.01);
(Continued)

(58) Field of Classification Search
CPC ............. G06F 11/1608; G06F 11/1629; G06F 11/1633; G06F 11/1637; G06F 11/1641;
(Continued)

(56) References Cited

U.S. PATENT DOCUMENTS 5,452,441 A * 9/1995 Esposito ............. G06F 11/1658
714/10
5,812,757 A   9/1998 Okamoto et al.
(Continued)

FOREIGN PATENT DOCUMENTS

EP        1 146 423       12/2001

OTHER PUBLICATIONS

Combined Search and Examination Report for GB1618654.6, dated May 2, 2017, 7 pages.
(Continued)

*Primary Examiner* — Michael Maskulinski
(74) *Attorney, Agent, or Firm* — Nixon & Vanderhye P.C.

(57) ABSTRACT

An apparatus 2 comprises at least three processing circuits 4 to perform redundant processing of a common thread of program instructions. Error detection circuitry 16 is provided comprising a number of comparators 22 for detecting a mismatch between signals on corresponding signal nodes 20 in the processing circuits 4. When a comparator 22 detects a mismatch, this triggers a recovery process. The error detection circuitry 16 generates an unresolvable error signal 36 indicating that a detected area is unresolvable by the recovery process when, during the recovery process, a mismatch is detected by one of the proper subset 34 of the comparators 22. By considering fewer comparators 22 during the recovery process than during normal operation, the chances of unrecoverable errors being detected can be reduced, increasing system availability.

11 Claims, 6 Drawing Sheets

(51) Int. Cl.
G06F 11/10 (2006.01)
G06F 11/18 (2006.01)
G06F 11/07 (2006.01)

(52) U.S. Cl.
CPC ...... G06F 11/1645 (2013.01); G06F 11/1658 (2013.01); G06F 11/184 (2013.01); G06F 11/187 (2013.01)

(58) Field of Classification Search
CPC ............. G06F 11/1645; G06F 11/1658; G06F 11/184; G06F 11/187
See application file for complete search history.

(56) References Cited

U.S. PATENT DOCUMENTS

| | | | |
|---|---|---|---|
| 6,141,769 A * | 10/2000 | Petivan | G06F 11/165 714/10 |
| 2006/0143513 A1 * | 6/2006 | Hillman | G06F 11/1658 714/13 |
| 2006/0236168 A1 * | 10/2006 | Wolfe | G06F 11/1641 714/724 |
| 2007/0260939 A1 | 11/2007 | Kammann et al. | |
| 2015/0339201 A1 * | 11/2015 | Kanekawa | G06F 11/165 714/6.11 |
| 2015/0363268 A1 | 12/2015 | Chandra et al. | |

OTHER PUBLICATIONS

Iturbe et al. "A Triple Core Lock-Step (TCLS) ARM® Cortex®—R5 Processor for Safety-Critical and Ultra-Reliable Applications", 2016 46th Annual IEEE/IFIP International Conference on Dependable Systems and Networks Workshop (DSN-W), Jun. 28-Jul. 1, 2016, 4 pages.

* cited by examiner

ERROR DETECTION TRIGGERING A RECOVERY PROCESS THAT DETERMINES WHETHER THE ERROR IS RESOLVABLE

This application claims priority to GB Patent Application No. 1618654.6 filed 4 Nov. 2016, the entire contents of which is hereby incorporated by reference.

BACKGROUND

Technical Field

The present technique relates to the field of data processing.

Technical Background

A data processing apparatus may be provided with at least three processing circuits to perform redundant processing of a common thread of program instructions. By performing the same processing operations on each of the redundant processors, outputs of the respective processing circuits can be compared to detect any mismatch which may signal that an error has occurred in one of the processing circuits. If an error occurs in one of the processing circuits, the outputs of the other two or more processing circuits can be used to recover from the error. This approach can be particularly useful for applications which are safety-critical or for which a failure would cause huge economic losses (e.g. space missions).

SUMMARY

At least some examples provide an apparatus comprising:
at least three processing circuits to perform redundant processing of a common thread of program instructions; and
error detection circuitry comprising a plurality of comparators, each comparator configured to detect a mismatch between signals on a corresponding signal node in said at least three processing circuits; wherein:
in response to at least one of said plurality of comparators detecting said mismatch, the error detection circuitry is configured to trigger a recovery process for resolving an error detected for an erroneous processing circuit using state information derived from at least two other processing circuits; and
the error detection circuitry is configured to generate an unresolvable error signal indicating that said error is unresolvable by said recovery process when, during said recovery process, a mismatch is detected between signals on a corresponding signal node in said at least two other processing circuits by one of a proper subset of said plurality of comparators.

At least some examples provide an apparatus comprising:
at least three means for processing for performing redundant processing of a common thread of program instructions;
means for detecting errors using a plurality of means for comparing, each means for comparing for detecting a mismatch between signals on a corresponding signal node in said at least three means for processing;
means for triggering, in response to at least one of said plurality of means for comparing detecting said mismatch, a recovery process for resolving an error detected for an erroneous means for processing using state information derived from at least two other means for processing; and
means for generating an unresolvable error signal indicating that said error is unresolvable by said recovery process when, during said recovery process, a mismatch is detected between signals on a corresponding signal node in said at least two other means for processing by one of a proper subset of said plurality of means for comparing.

At least some examples provide a method comprising:
performing redundant processing of a common thread of program instructions using at least three processing circuits;
detecting errors using a plurality of comparators, each comparator configured to detect a mismatch between signals on a corresponding signal node in said at least three processing circuits;
in response to at least one of said plurality of comparators detecting said mismatch, triggering a recovery process for resolving an error detected for an erroneous processing circuit using state information derived from at least two other processing circuits; and
during said recovery process, when a mismatch is detected between signals on a corresponding signal node in said at least two other processing circuits by one of a proper subset of comparators, generating an unresolvable error signal indicating that said error is unresolvable by said recovery process Further aspects, features and advantages of the present technique will be apparent from the following description of examples, which is to be read in conjunction with the accompanying drawings.

DESCRIPTION OF EXAMPLES

Examples of the present technique are discussed below. It will be appreciated that the invention is not limited to these particular examples.

Processing circuits may occasionally encounter an error, for example caused by a single event upset. A single event upset is a phenomenon that occurs in storage elements such as static random access memory (SRAM) and flip-flops, which causes a single bit of a stored value to change state. A single event upset may be caused by a particle, such as a cosmic ray from outer space or a particle or ion produced when a cosmic ray hits an atom in the Earth's atmosphere, striking a bitcell or flip-flop. This is a particularly a problem for electronics used for space applications where the device is intended to be used outside the Earth's atmosphere, but also for some terrestrial electronics. A classical solution to make a processor radiation-tolerant is to use rad-hard semiconductor process technology to manufacture the transistors and other devices forming the processor. However, this technology also increases the chip manufacturing costs, reduces the performance and leads to overheads in area and energy. Another approach is to provide redundant components within a single processor, e.g. multiple versions of the same register, or using error detection and correction schemes to protect data processed by the processor. However, this typically requires modification of an original processor design designed without such redundant features, so that the modified design is no longer as well optimized for performance/energy efficiency as the original processor design, and the additional verification and certification of the modified processor would lead to increased design costs.

Instead, redundancy can be provided at the system level, in which a data processing apparatus may be provided with at least three processing circuits to perform redundant processing of a common thread, and a set of comparators can be provided, each comparator comparing signals on corresponding signal nodes of each of the respective processing circuits. When one of the comparators detects a mismatch, an error is signalled. While bespoke processing circuit designs could still be used if desired, this approach has the benefit that it allows an existing, already verified and certified processor design to be used for each of the processing circuits, reducing design costs. By providing at least three redundant processing circuits (rather than only two), this allows errors to be not only detected but also corrected based on the two error-free processors, so that forward progress is made and previous processing results are not lost. This helps to reduce the time for which the system is unavailable following an error, which can be important for real-time operations.

When an error is detected, a recovery process can be triggered, e.g. to resolve the error detected in an erroneous processing circuit using state information derived from at least two of the other processing circuits. In some embodiments, the recovery process can be triggered as soon as the error is detected. Alternatively, some embodiments may allow the start of the recovery process to be delayed in some scenarios, with processing continuing using the two other processing circuits in the meantime. For example, this can be useful if the error is detected while executing a critical real-time computation, so that the system can continue processing using the two error-free processing circuits until the critical computation has completed, and then start the error recovery process to correct the erroneous processing circuit.

However, when performing the recovery process it is possible that a further error could arise. This can compromise the success of the recovery process, and so if a further error is detected, an unresolvable error may be signalled. For example, when an unresolvable error occurs, the recovery process may be halted and a more disruptive form of error handling may be used, e.g. a full system reboot, to avoid processing continuing based on potentially incorrect state information, but this may incur increased error recovery time.

Hence, the set of comparators may continue to check for errors during the recovery process. However, in practice, many of the comparators used in detecting errors during normal operation relate to signal nodes which are not actually involved in the recovery process. Even if errors are detected for such signal nodes, this may not affect the viability of the recovery process. Therefore, during the recovery process, errors may be detected using a proper subset of the set of comparators used for detecting errors during normal operation. By restricting the number of comparators which may trigger errors during the recovery process, this makes it less likely that an unresolvable error is signalled, reducing the need for more drastic error recovery steps such as a system reboot, and hence increasing system availability. This can be achieved with little additional area overhead since the error detection during the recovery process may reuse a subset of the comparators used for detecting errors during normal operation.

The signal nodes compared using the comparators of the error detection circuitry may be any nodes of the respective processing circuits. The signal nodes could be output ports used for outputting signals from the processing circuits, or internal signal nodes.

Which particular comparators are included in the proper subset of comparators may vary from implementation to implementation. For example, the proper subset of the comparator may comprise those comparators which correspond to the signal nodes of the processing circuits which are used in the recovery process. Hence, the comparators corresponding to signal nodes which are not used in the recovery process can be excluded from the proper subset. In practice, the number of signal nodes used in the recovery process may be a fraction of the total number of nodes compared using the error detection circuitry, so this allows the probability of unresolvable errors being detected to be greatly reduced.

In some examples, the recovery process may include storing to a storage unit state information derived from at least two other processing circuits other than the erroneous processing circuit. The recovery process may also include resetting the three or more processing circuits and then restoring the state information from the storage unit, so that the processing circuits can resume processing of the common thread of program instructions from the point at which the error was detected.

The proper subset of comparators may include at least those comparators which correspond to a first subset of signal nodes on which storage of the state information to the storage unit depends. For example, this may include the nodes used for outputting the state information itself, as well as nodes for outputting control information such as address signals or other information used to control the storage unit. Comparators corresponding to signal nodes in parts of the processing pipeline which are not used for saving the state information can be excluded from the error detection during the recovery process to reduce the chance of unrecoverable errors being signalled.

Some systems may have multiple storage units (e.g. multiple levels of cache, or different types of memory). For example, some systems may provide an additional memory which is integrated more closely with the processing pipeline than the cache, for faster access to a subset of data (e.g. such a memory may be referred to as a "tightly coupled memory"). Where multiple storage units are available, the choice of which storage unit is used for storing the state information during the recovery process affects the extent to which the probability of unrecoverable errors can be reduced.

Each storage unit may correspond to a given subset of the comparators, which are used for comparing the signal nodes relevant to the activity of pushing out the state information to that storage unit (again, these nodes may include not only the nodes used for outputting the information to be stored in the storage unit, but also nodes for associated control information such as addresses, read/write signals, context identifiers, etc.). Note that in some cases the subsets of comparators for different storage units may partially overlap—some nodes could be used for multiple storage units. Different storage units may correspond to subsets of comparators with different numbers of comparators. Hence, by storing the state information to the storage unit whose subset of comparators includes the fewest comparators, the chances of an unrecoverable error occurring can be reduced.

In one example, the tightly coupled memory may be used for storing the state information, as it may have a simpler control interface (e.g. fewer address bits or configuration bits) than the cache and so fewer signal nodes may be involved in storing data to the tightly coupled memory than the cache. Another advantage of using the tightly coupled memory may be that it is integrated deeper in the processing pipeline, and some external CPU hardware used for accessing the cache is not used when accessing the tightly coupled memory.

Another approach for reducing the number of comparators which need to be monitored during the recovery process can be to use less than the full capacity of the storage unit for storing the state information. Hence, the state information can be stored to a sub-portion of a data store (e.g. a cache) which is smaller than the full capacity, and the system may be excluded from storing state information to parts of the storage unit other than the designation sub-portion. For example the sub portion of the cache could correspond to a subset of the bits of each storage location rather than all of the bits. This allows the errors during the recovery process to be detected using comparators which correspond to signal nodes of the processing circuits on which outputting of information to that sub-portion of the storage unit depends, and excluding comparators relating to other parts of the storage unit (e.g. only a portion of the data channel may need to be monitored for errors), which again helps to reduce the total number of comparators which need to be considered for detecting errors during the recovery process.

The state information stored during the recovery process may be determined by majority voting circuitry, which selects state information determined to be the same in a majority of the at least three processing circuits. Hence, if one processing circuit has different state information to the other two or more processing circuits, the output of the majority of the processing circuits is used for the recovery process.

During normal operation, outputs of the processing circuits to a target unit (e.g. a shared storage unit or input/output port) can also be passed via the majority voter circuitry, which forwards to the target unit an output value determined to be the same for a majority of the processing circuits. This helps to isolate errors, since even if an error is detected in one of the processing circuits, the majority voting circuitry will prevent the erroneous values propagating to shared circuitry (e.g. a shared cache or input/output port), which simplifies the recovery process since it is not necessary to correct the error in the shared circuitry as the error has been confined to the processing circuits. Hence, the majority voting circuitry allows the recovery process to be faster, reducing the time for which the system is unavailable.

During the recovery process, the error detection circuitry may suppress the unresolvable error signal when none of the proper subset of comparators detects a mismatch between signals on the corresponding signal nodes in the at least two other processing circuits other than the erroneous processing circuit whose error triggered the recovery process. The error detection circuitry may suppress the unresolvable error signal when none of the proper subset of the comparators detects a mismatch, even if one of the other comparators not in the proper subset does detect a mismatch. A mismatch an output of the erroneous processing circuit itself and a corresponding output of another processing circuit may be ignored during the recovery process, as it could be caused by the same error which initially triggered the recovery process, and so such a mismatch may not trigger the unresolvable error signal.

In some cases the error detection circuitry may comprise an OR tree to combine outputs of the comparators. Each comparator may output a signal indicating whether an error has been detected for a given signal node in the respective processing circuits, and the outputs of the full set of comparators can be ORed together by the OR tree to generate an error detection signal. The recovery process may be triggered when the error detection signal indicates that at least one comparator has detected an error.

On the other hand, during the recovery process, the error detection circuitry may generate the unresolvable error signal dependent on an intermediate node of the OR tree which depends on outputs of the proper subset of comparators, and is independent of output signals of comparators other than the proper subset of comparators. For example, the proper subset of comparators may be grouped together on a particular branch of the OR tree, and the unresolvable error signal may be derived from an intermediate node of the OR tree which lies closer to the leaves of the tree rather than the node at which the error detection signal is output. Hence, some comparators are not considered for determining the unresolvable error signal.

A "proper subset" is a subset of a set which does not include all members of the full set. That is, at least one member of the full set is not a member of the proper subset.

Figure 1:
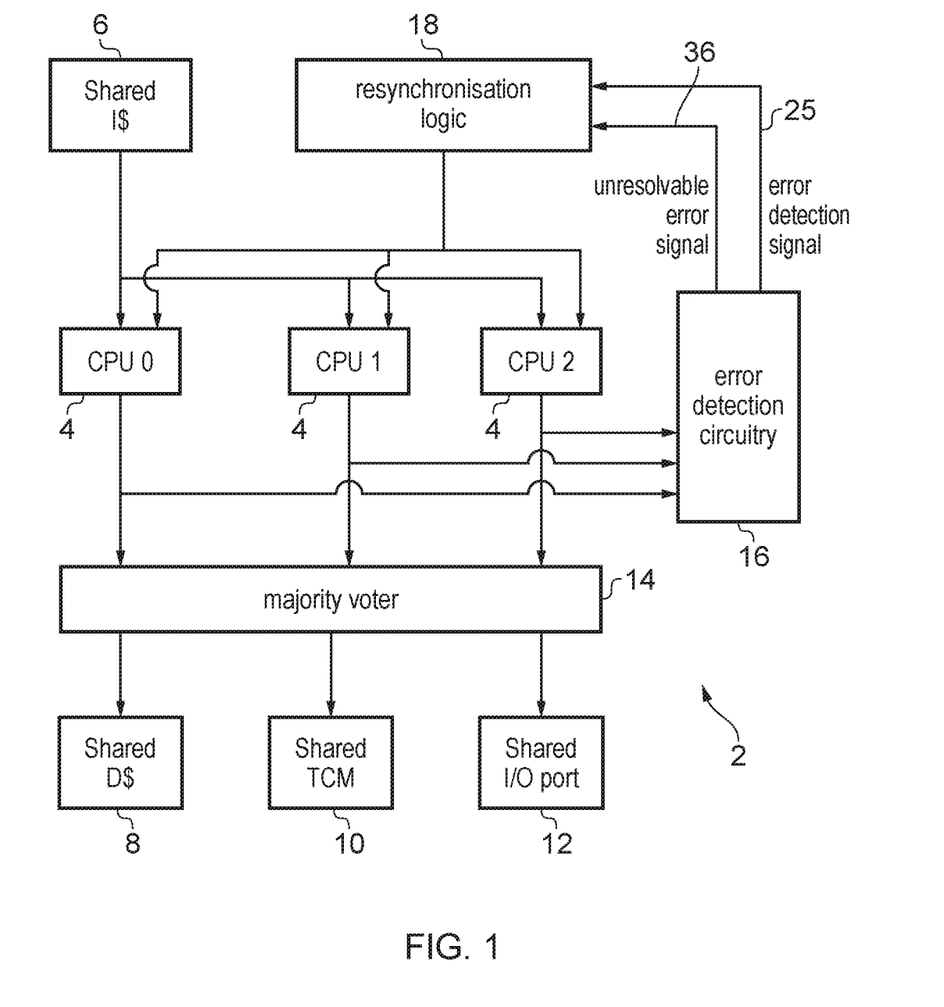
FIG. 1 schematically illustrates an example of an apparatus having three processing circuits for performing redundant processing of a common thread of program instructions.

FIG. 1 schematically illustrates an example of a data processing apparatus 2 with triple core lock step protection against errors. The apparatus 2 has three processors 4 for performing redundant processing of a common thread of program instructions. The three processors 4 can be placed in physically separated locations in an integrated circuit, to reduce the chance that an error affecting one processor 4 also affects another processor. The processors 4 share an instruction cache 6 which stores the instructions to be executed by the processors 4, as well as a shared data cache 8 and tightly coupled memory 10 for storing data processed by the processors 4, and a shared input/output (I/O) port 12 for communicating with peripheral devices. As the shared storage circuits 6, 8, 10 are not triplicated, the data/instructions stored in these units may be protected using error detecting or correcting codes (e.g. parity codes, cyclic redundancy checks, checksums, block codes, etc.), which provide some redundant information to allow for at least detection of errors caused by SEUs in the storage circuits (and optionally correction of the errors too). The outputs of the processors 4 are passed to majority voter circuitry 14 which selects, as the output to be passed to the shared data cache 8, TCM 10 or I/O port 12, the value generated by a majority of the processors 4, i.e. at least two of the processors. Also, the outputs of the processors are passed to error detection circuitry 16 which compares the outputs and detects an error when two or more of the processors generate different results. Resynchronisation logic 18 is provided for triggering a recovery process for recovering from errors.

Hence, at each clock cycle, the instructions to execute are read from the shared instruction cache 6 or the TCM 10, and distributed to the triplicated processors (CPUs) 4. The CPU outputs are majority-voted and forwarded to the shared data cache 8, TCM 10, and I/O ports 12. Simultaneously, the error detection logic 16 checks if there is any mismatch in the outputs delivered by the three CPUs 4. If there is a mismatch, all CPUs are interrupted and the error detection logic 16 identifies whether it is a correctable error (only one of the CPUs delivers a different set of outputs) or an uncorrectable error (all CPUs deliver different outputs). If the error is correctable, the resynchronization logic 18 corrects the architectural state of the erroneous CPU 4, that is, resynchronizes all the CPUs. In the highly unlikely case that the error is uncorrectable, the system transitions to a fail-safe operation state. Note here that the majority voter circuitry 14 acts as an error propagation boundary, preventing correctable errors from propagating to memories 8, 10 and I/O ports 12. While the majority voter circuitry 14 is on the critical path of the system 2, it is made from combinational logic which is relatively fast. The error detection logic 16 is out of this critical path and may be pipelined to increase performance.

When a correctable (resolvable) error is detected, the resynchronisation (recovery) process can be triggered immediately, or could wait for software to start it in response to the CPU interrupt. Delaying the start of the resynchronisation process can sometimes be useful to prevent the interruption of critical real-time tasks. Note that when an error is detected in one CPU 4, the system can still work safely with the two remaining CPUs, which are in a functionally correct state. In fact, the correct architectural state to be restored in the erroneous CPU is recovered from these two CPUs in the recovery process. This is done by issuing an interrupt to the CPUs 4, which flushes their pipelines and pushes out their architectural state (e.g. register files, program counter and state registers) to a storage device, such as the cache 8 or TCM 10. The CPU architectural states are passed through the majority voter circuitry 14, and may be stored in a program stack mapped to the ECC-protected TCM 10, for example. At the end of the interrupt handler which performs the state saving, the CPUs enters a Wait for Event (WFE) low-power standby mode. When the resynchronization logic 18 observes the WFE signal, it issues a reset to the three CPUs 4 to scrub away any soft error that might exist in their micro-architecture registers. This reset also wakes up the CPUs from the standby mode, initiating the restoration of the architectural state that was previously pushed onto the program stack. The last register to be restored is the program counter, thus resuming the normal operation of the CPUs at the same point in the code where it was suspended to launch the resynchronization process. The recovery process initiated by the resynchronisation logic 18 is automatic and transparent to the software.

Figure 2:
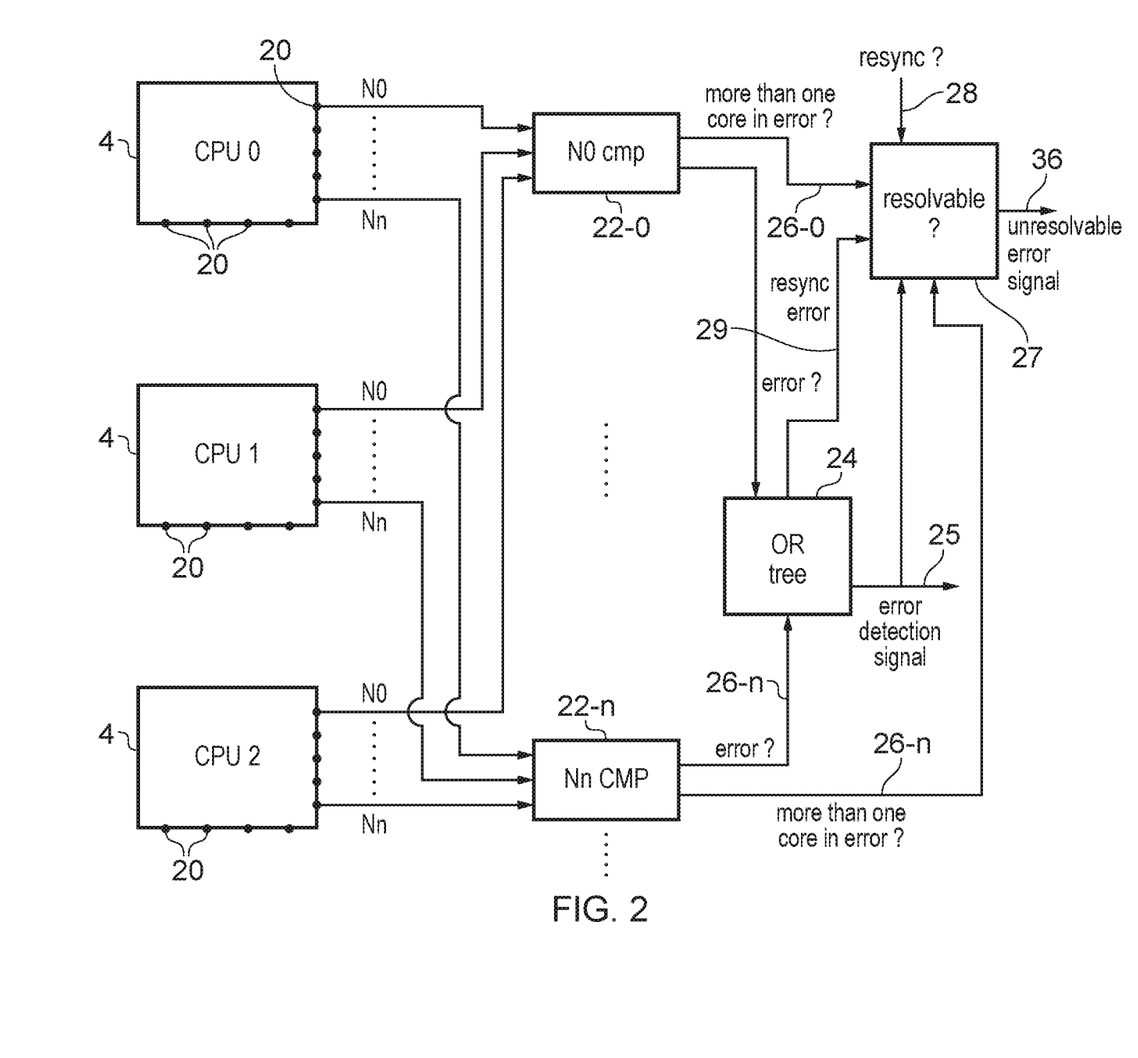
FIG. 2 shows an example of detecting errors using a set of comparators for comparing corresponding signal nodes in the respective processing circuits.

FIG. 2 schematically illustrates an example of the error detection circuitry 16 in more detail. Each of the processors (also referred to as cores) 4 has a number of signal nodes 20 which may be output ports or internal signal nodes within the circuits. The particular signal nodes selected for comparison may vary from implementation to implementation, but may include the nodes which carry the inputs or outputs of processing operations, or control values such as instruction opcodes, memory addresses or register specifiers. The error detection circuitry 16 includes a number of comparators 22 each corresponding to one of the types of signal nodes 20. Each comparator 22 receives the signal values from the corresponding signal node in each of the three processors 4. For example comparator 22-0 in the example of FIG. 2 receives the signals from node N0 in each of the processors 4 while comparator 22-*n* receives the signals from node Nn in the three processors 4. While FIG. 2 shows only two comparators for conciseness, it will be appreciated that similar comparators 22 would be provided for each of the nodes of interest.

Each comparator 22 determines whether all of the signals from the corresponding signal nodes are the same, and asserts its output signal if any divergence between the signals on the corresponding signals nodes is detected. An OR tree 24 combines the outputs of all the comparators 22 according to a logical OR operation to generate an error detection signal 25 which signals whether an error has been detected.

In addition, each comparator 22 may also output a second signal 26 indicating whether only one of the processors 4 had a different output to the other processors, or whether more than one processor 4 is in error (when the three processors all have different outputs). Resolvable error logic 27 (e.g. a second OR tree) receives the signals 26 identified at each comparator 22, as well as the error detection signal 25, and a signal 28 indicating whether the resynchronisation (recovery) process is currently being performed.

During normal operation (when the resynchronisation process is not currently being performed), if the error detection signal 25 indicates that an error was detected, the resolvable error logic 27 determines from signals 26 whether more than one of the processors 4 has encountered error, and if so asserts the unresolvable error signal 36, indicating that the error cannot be resolved using the resynchronisation process. If errors were only detected for one of the processors 4, the unresolvable error signal is deasserted, indicating that the resynchronisation process can be performed.

During the resynchronisation process, the resolvable error logic 27 detects whether the OR tree 24 has detected a mismatch between the outputs of the two cores 4 other than the erroneous core whose error led to the resynchronisation process, using only a proper subset of the comparators 22, not the full set of comparators 22, and if so asserts the unresolvable error signal 36 to suspend the resynchronisation process and trigger entry to the failsafe state, exit from which may require a full system reboot and pipeline flush. The OR tree 24 provides a resynchronisation error signal 29 which indicates whether any of the proper subset of comparators 22 has detected an error during the resynchronisation process. The unresolvable error signal 36 is asserted when the resynchronisation error signal 29 is asserted and the signal 28 indicates that the recovery process is being performed.

Figure 3:
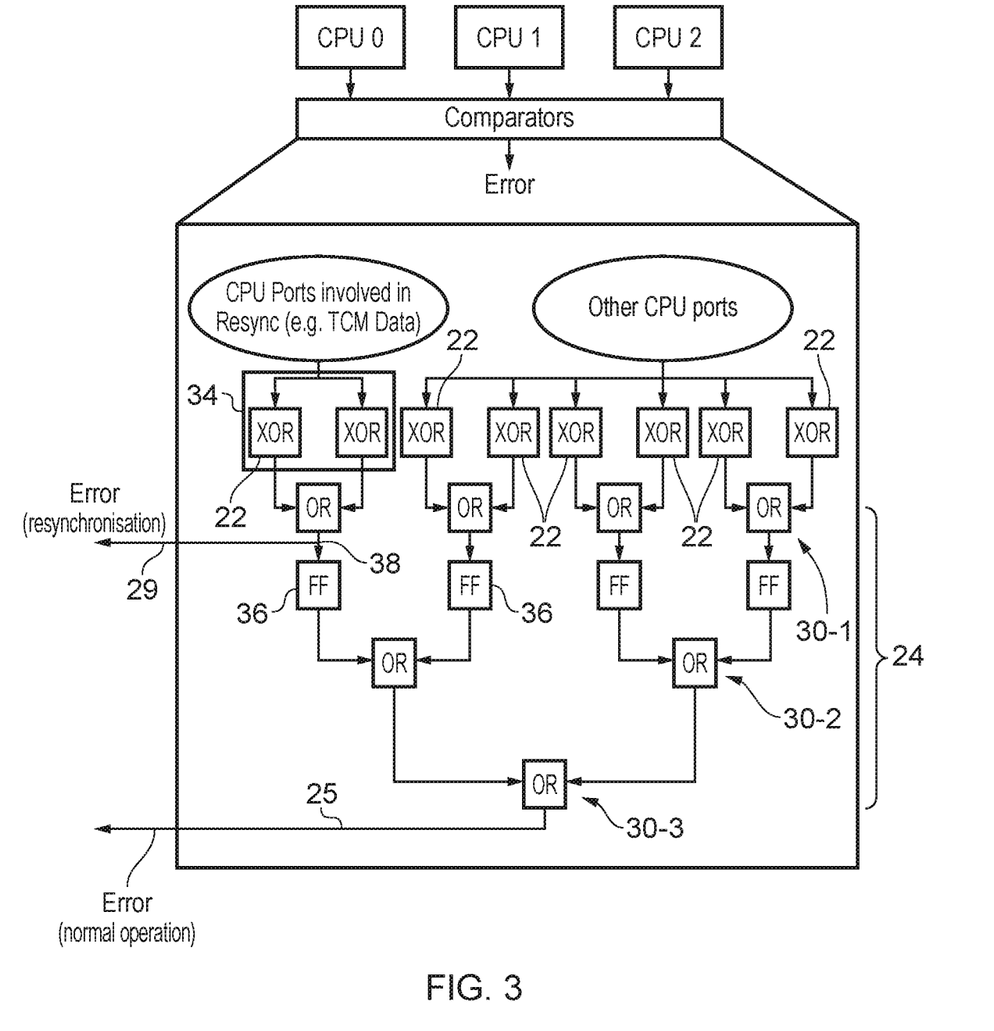
FIG. 3 illustrates an example of detecting errors during a recovery process using a proper subset of the set of comparators.

The OR tree 24 is shown in more detail in FIG. 3. The comparators 22 are represented as XOR gates. The OR tree 24 includes a number of levels 30 of OR gates where each level 30 includes one or more OR gates which combine outputs of two OR gates from the previous level. Some levels of OR gates may be separated by flip-flops 36 in order to maintain sufficiently high amplitude at the final OR gate. The first level 30-1 of the tree includes OR gates which each combine the outputs of two of the comparators 22. Each subsequent level 30-2, 30-3 includes further OR gates which combine the outputs of two OR gates from a preceding level, and the output of the OR gate 30-3 in the final level of the tree is the error detection signal 25. It will be appreciated that in practice there will be more than 3 levels of OR gates in the OR tree 24, depending on the number of nodes being compared. During normal operation, the entire OR tree is used and the outputs of the entire set of comparators 22 are combined in successive levels of OR operations until resolved to a single error detection signal 25.

However, when performing the recovery process using the resynchronisation logic 18, most of the comparators 22 compare outputs on signal nodes which are not actually used during the recovery process and so even if an error is detected on these nodes this would not prevent the recovery process being completed successfully. Therefore, to reduce the chance of spurious detection of unrecoverable errors, during the resynchronisation process errors are detected using a proper subset 34 of the comparators 22. As shown in FIG. 3, the proper subset 34 of comparators 22 can be grouped together in the same branch of the OR tree, and the resynchronisation error signal 29 can be tapped off at an intermediate node 38 of the OR tree 24, rather than the final node as for the error detection signal 25. Hence, the resynchronisation error signal 29 is independent of the output of comparators 22 other than the proper subset 34.

The proper subset of comparators 34 may be those comparators which compare the outputs of CPU ports which are involved in the recovery (resynchronisation) operation. For example the comparators 34 may be those used in pushing out the state information to the storage unit (e.g. TCM 10) and may exclude other CPU ports. In a typical processor, there may be over 2000 output ports in total to be compared using respective comparators 22, while the number of ports involved in the resynchronisation may be of the order of 200 ports, so restricting the error detection during the recovery process to the proper subset 34 of comparators 22 can reduce the chances of an unrecoverable error being detected around 10 times. This reduces the number of times when a full system reset is required, allowing the system to remain online more often, which can be important when performing real-time-critical tasks.

Figure 4:
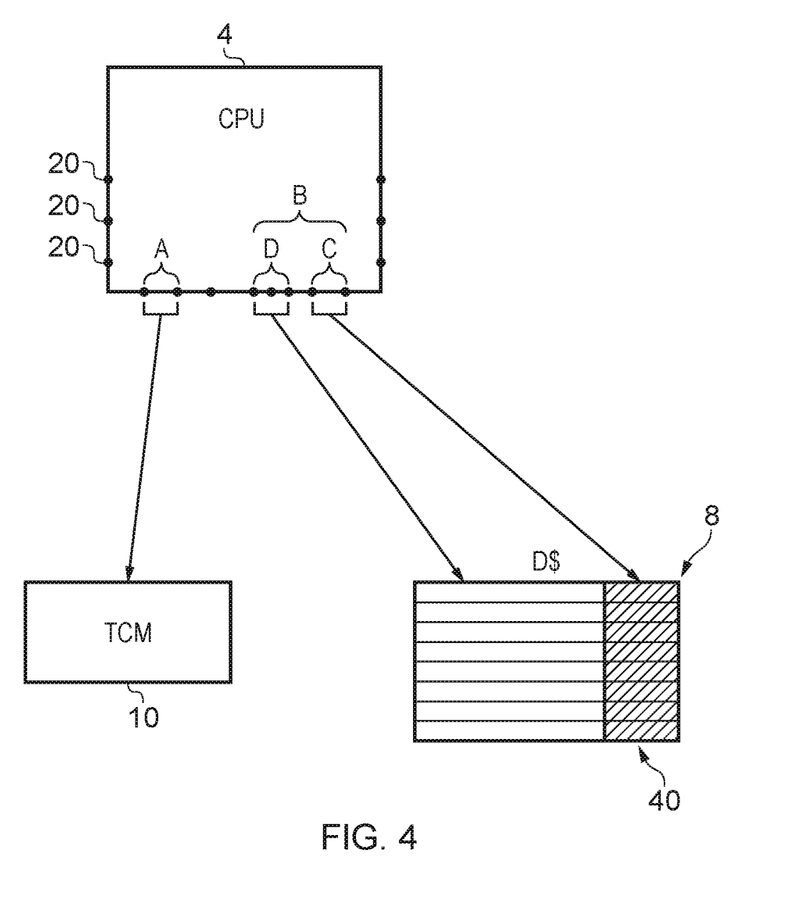
FIG. 4 shows how different subsets of signal nodes of the processing circuit may be used for interacting with different storage units.

FIG. 4 shows how different storage units may use different subsets of the output nodes 20 of the processor 4. For example, writing data to the TCM 10 may use a first subset of nodes A, while writing data to the cache 8 may use a second subset B. The nodes in subsets A and B may for example include the output ports used for outputting the data bits and configuration bits (address, read/write, priority information, etc.) for controlling writing of data to the corresponding storage unit. It will be appreciated that while FIG. 4 for conciseness shows 2 and 5 nodes in subsets A and B respectively, in practice the subsets include more nodes. Also, while subsets A and B are shown as separate in FIG. 4, in some cases at least one node could be used both when storing data to the TCM 10 and when storing data to the cache 8, so that the subsets could overlap.

The state information saved during the recovery process could be stored to either the TCM 10 or the cache 8. However, as the TCM 10 in this example has a smaller subset of nodes associated with it (subset A has fewer nodes than subset B), if the state information is saved to the TCM 10, then fewer comparators 22 can be used for monitoring errors during the resynchronisation process. Hence, by using the TCM 10 which typically has a smaller control interface than the cache 8, to store the architectural state during the recovery process this can reduce the number of output ports which need to be compared for errors, further reducing the chances of unrecoverable errors being detected. In other examples, if the cache 8 has the fewest nodes associated with it, then it could be used for storing the state information.

Alternatively, rather than storing the state information to any part of a storage unit 8, 10, only a portion of the storage unit could be used. For example, as shown in the example of FIG. 4, writing data to a certain sub-portion 40 of the cache may only require use of a first portion C of the subset B of output ports 20 associated with the cache 8, with a remaining portion D only used when the other parts of the cache are written to. Therefore, to reduce the number of ports to be monitored for errors, the state information could be restricted to being stored in a certain sub-portion 40 of the cache. For example in FIG. 4 the sub-portion corresponds to the least significant N bits of each cache line. Hence, output ports D which output the data for more significant portions of each cache line do not need to be compared for errors, so that there is less chance of an unresolvable error being detected during the recovery process.

Figure 5:
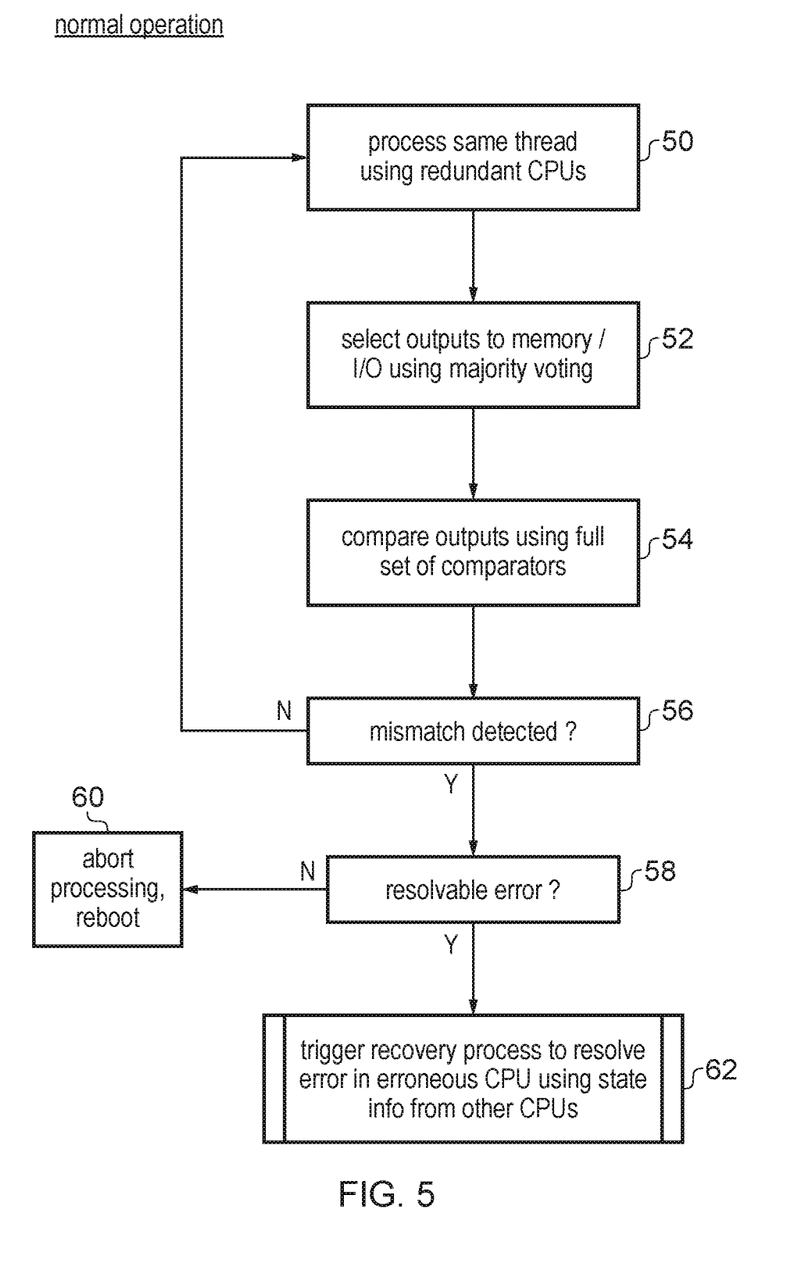
FIG. 5 is a flow diagram showing a method of detecting errors during normal operation of the apparatus.

FIG. 5 shows a flow diagram illustrating normal operation of the system shown in FIG. 1. At step 50 the same thread of program instructions is processed using three redundant processors 4 (optionally, more than three processors 4 could be provided if further redundancy is desired for added confidence). At step 52 the outputs of the processors are subject to majority voting using the majority voter circuitry 14, which selects the outputs which are the same for at least two of the processors 4. These outputs are provided to the shared data cache 8, TCM 10 or I/O port 12 as appropriate. At step 54 the outputs are compared using the full set of comparators 22 of the error detection circuitry 16. At step 56 the error detection circuitry 16 detects whether a mismatch is detected by any of the comparators 22. If not, then processing continues at step 50. When a mismatch is detected by any of the comparators 22 of the error detection circuitry 16 then at step 58 it is detected whether the error is a resolvable error. If the error is not a resolvable error (that is, if each of the processors have generated a different result) then at step 60 the system enters the failsafe state when processing is aborted, and a full system reboot is triggered to flush the pipelines of the processors 4 of any architectural state. After the reboot, processing is restarted, and any previous results of processing of the thread may be lost. Hence, the reboot is a last resort if the error cannot be resolved by the recovery process.

On the other hand, if the error is resolvable, when only one of the processor 4 has an output differing from the other two processors 4, then at step 62 a recovery process is triggered using the resynchronisation circuitry 18 to resolve the error in an erroneous processor 4 using state information from the other processors 4. Note that the error detection circuitry 16 does not actually need to signal to the resynchronisation logic 18 which of the processors is the erroneous processor since the recovery process is such that the state saving/restoration will restore the correct state information to all of the processors 4, since the majority voter circuitry 14 will have sanitised the state information which is written out to the data store based on the outputs of the majority of processors 4. However, the error detection logic 16 could store an indication of which core is the erroneous core so that during the recovery process mismatches between the erroneous core and one of the other cores do not trigger an unresolvable error.

While FIG. 5 for ease of explanation shows steps 50-54 being performed sequentially, in practice the error detection step 54 may be pipelined, so that the error detection step 54 using the outputs from one cycle occurs in parallel with the processing at step 50 of a following cycle, so that the error detection processing does not delay subsequent processing.

Figure 6:
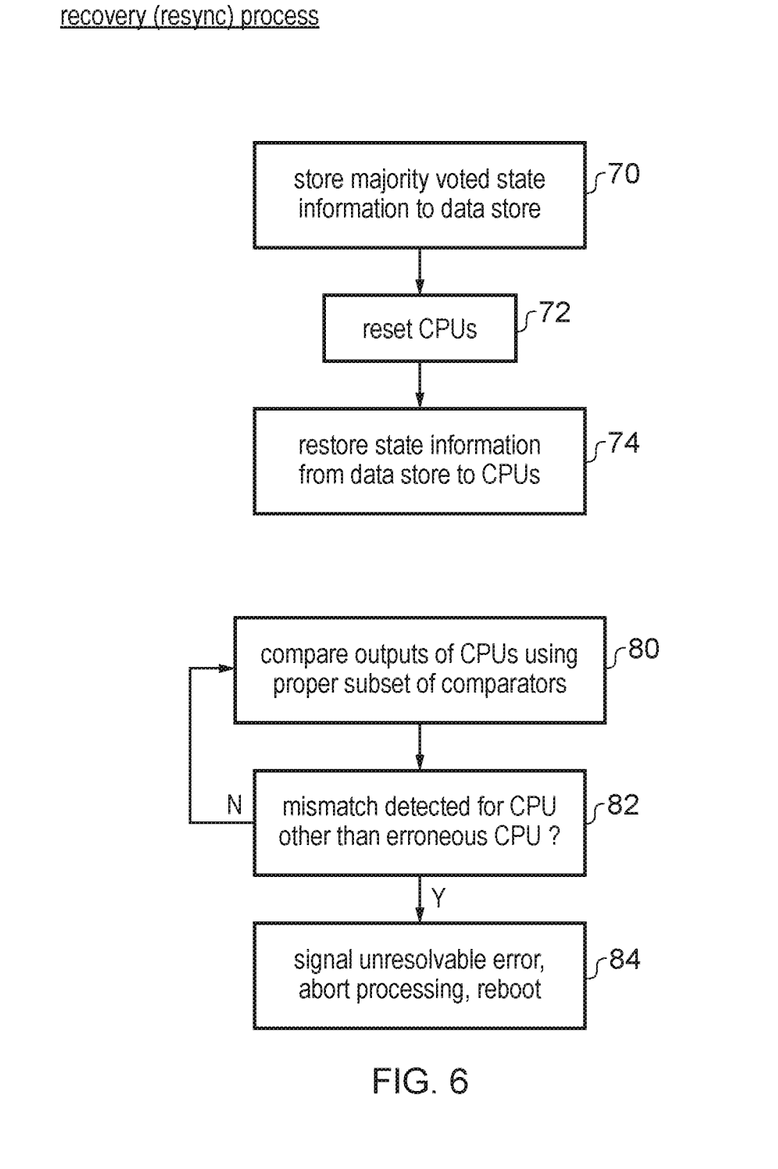
FIG. 6 is a flow diagram illustrating a method of performing a recovery process for recovering from errors detected during normal operation.

FIG. 6 shows a flow diagram illustrating the recovery process. FIG. 6 is illustrated in two parts showing two separate sets of steps 70 to 74 and 80 to 84. Steps 80 to 84 can be performed in parallel with steps 70 to 74. Steps 70 to 74 represent the steps taken to recover from the error and allow the processors 4 to resume processing of the thread, while steps 80 to 84 represent the steps taken to detect whether any further error occurs during the recovery process.

At step 70, the resynchronisation logic 18 generates an interrupt which is passed to the processors 4 and causes an interrupt handler to execute and save a set of state information to a data store, which could be the data cache 8 or the TCM 10 as discussed above. The state information pushed out to the data store may include any of the processors' architectural state, for example register files, status registers, co-processor registers, and any other information required for resuming processing of a given thread from the point at which it left off. Typically the state information may include a program counter representing the instruction being executed at the current point of execution. Note that because of the error, one of the processors 4 may have incorrect values for some state information. However, as each of the processor 4 outputs its state information to the majority voter circuitry 14, the majority voter circuitry 14 can detect which of the processors has a different value to the other two, and use the common values generated by the two processors generating identical results as the values to be stored to the data store 8, 10.

At step 72, each of the processors 4 is reset, to flush the contents of the processing pipelines of each processor 4 and clear the contents of registers. This eliminates any residual errors remaining within the processors 4. At step 74 the state information previously stored to the data store 8, 10 is restored to the registers of each processor 4. The final piece of state information written back to the processors 4 is the program counter, and then processing of the thread of instructions being executed resumes from the point at which it left off before the error was detected. Hence with this recovery process the system is out of operation for only a short period of time and does not have to repeat the processing being performed before the error occurred.

Meanwhile, at step 80 the outputs of the processors 4 are compared by the error detection circuitry 16. The erroneous processor 4, for which the error which triggered the recovery process was detected, may not influence this error detection—e.g. the outputs of comparators which identify the erroneous processor 4 as still being erroneous may be gated before input to the OR tree 24, to reduce the chance of unresolvable errors being signalled. At step 80, only a proper subset 34 of the comparators is considered, and the other comparators 22 are ignored. At step 82 it is determined whether a mismatch is detected by any of the proper subset of comparators 34. If not, then at step 80 the error detection circuitry 16 continues to check for errors. When a mismatch is detected then at step 84 the unresolvable error signal 36 is generated and this can again trigger an abort and system reboot as at step 60.

In summary, while pushing out the architectural state during the recovery process, only the signals and ports through which this state is transferred to the memory are considered in the error detection, which can be less than 200 ports in a typical processor. This is achieved by using only a subset of the comparator logic while executing the resynchronisation routines and as this comparator logic is already provided for detecting the errors during the normal operation, this comes at almost zero area additional overhead. Hence, errors occurring in units which are not involved in the resynchronisation process are not considered. This avoids unnecessary uncorrectable errors being signalled during the recovery phase which increases system availability.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   at least three processing circuits to perform redundant processing of a common thread of program instructions; and
   error detection circuitry comprising a plurality of comparators, each comparator configured to detect a mismatch between signals on a corresponding signal node in said at least three processing circuits; wherein:
   in response to at least one of said plurality of comparators detecting said mismatch, the error detection circuitry is configured to trigger a recovery process for resolving an error detected for an erroneous processing circuit using state information derived from at least two other processing circuits;
   the error detection circuitry is configured to generate an unresolvable error signal indicating that said error is unresolvable by said recovery process when, during said recovery process, a mismatch is detected between signals on a corresponding signal node in said at least two other processing circuits by one of a proper subset of said plurality of comparators; and
   during the recovery process, the error detection circuitry is configured to suppress said unresolvable error signal when none of said proper subset of comparators detects said mismatch between signals on the corresponding signal node in said at least two other processing circuits.

2. The apparatus according to claim 1, wherein said proper subset comprises the comparators corresponding to signal nodes used in said recovery process.

3. The apparatus according to claim 1, wherein said recovery process comprises storing said state information to a storage unit.

4. The apparatus according to claim 3, wherein said recovery process comprises resetting said at least three processing circuits and restoring the state information from the storage unit to said at least three processing circuits to resume processing of the common thread of program instructions.

5. The apparatus according to claim 3, wherein outputting of said state information to the storage unit is dependent on signals on a first subset of signal nodes, and said proper subset comprises at least the comparators corresponding to said first subset of signal nodes.

6. The apparatus according to claim 3, wherein said recovery process comprises storing said state information to a sub-portion of the storage unit; and said proper subset comprises at least the comparators corresponding to signal nodes on which outputting of said state information to said sub-portion of the storage unit is dependent.

7. The apparatus according to claim 1, comprising majority voting circuitry to determine, as said state information to be used in said recovery process, state information which is determined to be the same in a majority of said at least three processing circuits.

8. The apparatus according to claim 1, wherein the error detection circuitry comprises an OR tree to combine outputs of said plurality of comparators.

9. The apparatus according to claim 8, wherein the OR tree is configured to generate an error detection signal for triggering said recovery process, wherein said error detection signal is dependent on outputs of each of said plurality of comparators.

10. An apparatus comprising:
at least three processing circuits to perform redundant processing of a common thread of program instructions; and
error detection circuitry comprising a plurality of comparators, each comparator configured to detect a mismatch between signals on a corresponding signal node in said at least three processing circuits; wherein:
in response to at least one of said plurality of comparators detecting said mismatch, the error detection circuitry is configured to trigger a recovery process for resolving an error detected for an erroneous processing circuit using state information derived from at least two other processing circuits;
the error detection circuitry is configured to generate an unresolvable error signal indicating that said error is unresolvable by said recovery process when, during said recovery process, a mismatch is detected between signals on a corresponding signal node in said at least two other processing circuits by one of a proper subset of said plurality of comparators;
the error detection circuitry comprises an OR tree to combine outputs of said plurality of comparators; and
during said recovery process error detection circuitry is configured to generate said unresolvable error signal dependent on an intermediate node of said OR tree which is dependent on outputs of said proper subset of comparators and independent of outputs of comparators other than said proper subset of comparators.

11. A method comprising:
performing redundant processing of a common thread of program instructions using at least three processing circuits;
detecting errors using a plurality of comparators, each comparator configured to detect a mismatch between signals on a corresponding signal node in said at least three processing circuits;
in response to at least one of said plurality of comparators detecting said mismatch, triggering a recovery process for resolving an error detected for an erroneous processing circuit using state information derived from at least two other processing circuits; and
during said recovery process, when a mismatch is detected between signals on a corresponding signal node in said at least two other processing circuits by one of a proper subset of comparators, generating an unresolvable error signal indicating that said error is unresolvable by said recovery process, wherein:
during the recovery process, suppressing the unresolvable error signal when none of said proper subset of comparators detects said mismatch between signals on the corresponding signal node in said at least two other processing circuits.

* * * * *